United States Patent Office 3,652,538

Patented Mar. 28, 1972

3,652,538
FORMULATION PROCESS FOR POLYNUCLEOTIDE HOMOPOLYMERS
John F. Niblack, Noank, Conn., assignor to Pfizer Inc., New York, N.Y.
No Drawing. Filed Aug. 8, 1969, Ser. No. 848,716
Int. Cl. C07d *51/52, 51/54*
U.S. Cl. 260—211.5 R 2 Claims

ABSTRACT OF THE DISCLOSURE

Clear, non-particulate, free-flowing, sterile, aqueous solutions of polyinosinic:polycytidilic acid complexes suitable for medicinial application are prepared by an improved process.

BACKGROUND OF THE INVENTION

This invention generally relates to the preparation of solutions of polynucleotide homopolymers. More specificilly it relates to an improved process for the preparation of concentrated solutions of polyinosinic and polycytidilic acid complexes, known as poly I and poly C respectively, and poly I:C jointly. Together as poly I:C they form a synthetic double-stranded complex which is useful as an inducer of interferon.

Solutions of poly I:C are commonly prepared by mixing together solutions of poly I and poly C, in the presence of a salt solution, e.g., 0.1 M NaCl, at about pH 7, at room temperature or with slight warming. When mixing together solutions of poly I and poly C having concentrations greater than 0.1 percent w./v. a lumpy, translucent, thick gel forms. Said gel has extremely poor flow characteristics. This gel if permitted to stand at room temperature for about one to two weeks, finally clears to a very viscous liquid. The poly I:C prepared in this fashion is not sterile and must be subsequently sterilized if intended for parenteral use. The gel is also readily prone to contamination with micro-organisms during the aforementioned curing process. Moreover, the high viscosity of poly I:C solutions of greater than 0.1% w./v. concentrations can preclude parenteral and aerosol administration due to the aforementioned poor flow characteristics.

SUMMARY OF THE INVENTION

An improved process is now disclosed for the preparation of concentrated, sterile, aqueous polyinosinic:polycytidilic acid solutions which comprises dissolving each of the said polymers separately in salt-buffer solution, combining said separate solutions to form gelatinous, turbid complexes and heating said complexes until clear, free-flowing sterile solutions are formed. The physical properties of these solutions make them more suitable for medicinal administration by injection or aerosol with biological potency and toxicity properties remaining essentially unchanged.

DETAILED DESCRIPTION OF THE INVENTION

The improved process of this present invention which enables the preparation of concentrated solutions of poly I:C of up to three percent w./v. cconcentration can be achieved by the following steps:

(a) The polyinosinic acid is dispersed in purified water, preferably glass distilled, at about twice the concentration desired in the final polyinosinic acid solution and heated to about 50 to about 60 degrees C. until the solution is complete. The time required for solution is about 10 to about 30 minutes depending on the desired concentration of the polyinosinic acid solution. To this solution is then added approximately an equal volume of aqueous salt-buffer mixture, e.g., 0.2 M NaCl–0.02 M phosphate buffer solution, to buffer the solution at about pH 6.5 to 7.5 the preferred pH being about 7.0.

(b) The polycytidilic acid in the desired concentration is dispersed and dissolved in an aqueous salt-buffer solution, e.g., 0.1 M NaCl–0.01 M phosphate buffer solution, to buffer the solution at pH 6.5 to 7.5, the preferred pH being about 7.0.

(c) Equal volumes of polyinosinic acid and polycytidilic acid solutions of equal concentrations are mixed at ambient temperature and stirred until homogeneous. A thick translucent poly I:C gel results.

(d) The aforementioned gel is then heated for about 10 to about 20 minutes at about 115 to about 135 degrees C. The preferred conditions, however, are 15 minutes at 125 degrees C. A steam autoclave or other sealed container may be used for this step to insure sterility and to insure that the liquid does not boil.

The solution is allowed to cool slowly. The resulting solution is clear, free-flowing, sterile and lowered in viscosity. The mechanisms involved in the new process are not yet fully understood. It has been demonstrated, however, that poly I:C solutions can be prepared in this manner due to the fact that the thermal disruption of the double helix, formed by poly I with poly C, is reversible. The sodium chloride present in the solution affects the pitch of the poly I and poly C strands and insures the formation of a double helix.

Other buffer systems besides a phosphate buffer may be used to obtain the desired pH, e.g., 0.01 M to 0.05 M tris-hydroxymethyl aminomethane buffer. The choice of buffer is not critical to this present invention and is within the skill of the art.

These solutions are useful in interferon stimulation and may be administered as aerosol mists or intravenous injections.

This rapid convenient process for formulating sterile, aqueous solutions of poly I:C has facilitated aerosol formulation of the polymer complex for inhalation administration to man. Poly I:C so formulated is easily aerosolized from simple 70 p.s.i. atomizers to a droplet size of 5–15$\mu$, which is readily accessible to the deep passages of both upper and lower respiratory tracts. Aerosolization has been shown to have no effects on the interferon inducing potency of poly I:C.

The following examples are given by way of illustration and are not to be construed as limitations of this invention, many variations of which are possible within the scope and spirit thereof.

EXAMPLE I

Preparation of poly I:C 10 mg./ml.

One gram of poly I is dispersed in approximately 50 ml. of glass-distilled water and heated at 60 degrees C. until solubilized. A solution of 0.2 M. NaCl–0.02 M phosphate buffer is then added to bring the volume up to 100 ml., giving a poly I concentration of 10 mg./ml. and a pH of about 7.0.

One gram of poly C is dispersed and dissolved in sufficient 0.1 M NaCl–0.01 M phosphate buffer to bring the volume up to 100 ml. The poly C concentration is 10 mg./ml. with the pH of the solution approximately 7.0.

Equal volumes of the poly I solution and the poly C solution, 100 ml. each, are mixed at room temperature and stirred until homogeneous; a thick translucent gel results.

The above mentioned gel is then placed in a sealed glass bomb and heated at 125 degrees C. for 15 minutes and allowed to cool to room temperature. The resulting poly I:C solution containing 10 mg./ml., 5 mg./ml., of poly I and 5 mg./ml. of poly C, is clear or only slightly opalescent, flows freely and shows a greatly reduced viscosity in comparison with untreated material.

EXAMPLE II

Solutions containing poly I:C 30 mg./ml., 15 mg./ml. of poly I and 15 mg./ml. of poly C are also prepared by the procedure as outlined in Example I.

EXAMPLE III

The following table contains comparative data for the products of the prior art process and the new process:

POLY I:C 10 mg./ml.

|  | Prior art process | New process |
|---|---|---|
| General appearance | (1) | (2) |
| Relative flow rates [3] | 1,590 | 353 |
| Light scattering ($E_{400\,m\mu}$) | 0.184 | 0.074 |
| Syringe passage, minimal needle gauge | [4] 18 | <25 |
| Aerosol particle size (70 p.s.i. dispenser)$\mu$ | (5) | 5-15 |
| $LD_{50}$ (acute, i.p., mouse) mg./kg | 75 | 75 |
| Interferon minimum effective dose (mouse) mg./kg | 1 | 1 |

[1] Lumpy, cloudy particulate gel.
[2] Slightly light-scattering liquids.
[3] $\dfrac{\text{Flow time of 1\% solution}}{\text{Flow time of buffer}}$. Flow measured thru 85 mm. in a 2.5 mm. internal diameter plastic tube; 180 mm. pressure head.
[4] No flow.
[5] Not aerosolizable.

The above data clearly point out the enhanced physical properties of the new process over the prior art process. They also illustrate that the biological potency and toxicity remain the same.

What is claimed is:

1. An improved process for the preparation of concentrated aqueous, sterile, polyinosinic:polycytidilic acid solution which comprises dissolving each of said polymers separately in salt-buffer solution at about pH 6.5 to 7.5, combining said separate solutions to form gelatinous, turbid complex and heating said complex until clear, free-flowing solution is formed.

2. A process for preparing aqueous, sterile, polyinosinic-polycytidilic acid complex solution containing a total concentration of from about 0.5 to 3 percent w./v. of said complex, said process comprising the steps of:
    (a) dispersing polyinosinic acid in water and heating said dispersion to from about 50 to 60 degrees C. until solution is complete and adding approximately an equal volume of salt-buffer solution at about pH 6.5 to 7.5;
    (b) dissolving polycytidilic acid in salt-buffer solution at about pH 6.5 to 7.5 to substantially the same concentration as that of said polyinosinic acid solutions;
    (c) mixing equal volumes of said polyinosinic and polycytidilic acid solutions and stirring until homogeneous gel is produced; and
    (d) heating said gel for about 10 to 20 minutes at about 115 to 135 degrees C.

References Cited

Miles "Chem. Abst.," vol. 55, 1961, p. 23606(c).

Burlage et al. "Fundamental Principles and Process of Pharmacy," 2nd ed., McGraw-Hill Book Co., Inc., New York, 1949.

LEWIS GOTTS, Primary Examiner

J. R. BROWN, Assistant Examiner

U.S. Cl. X.R.

424—180